D. M. SMYTH.
Platform Balance.
No. 12,698.
Patented April 10, 1855.
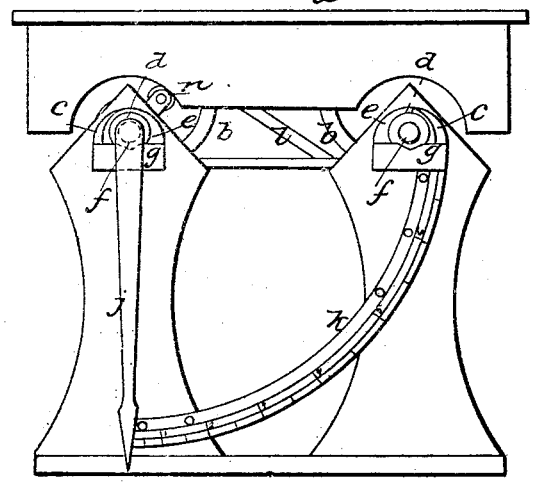
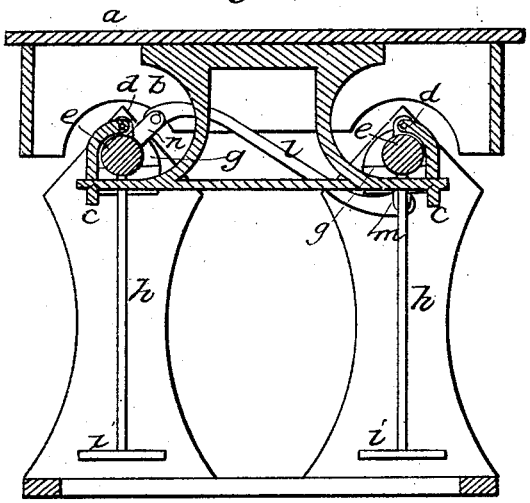
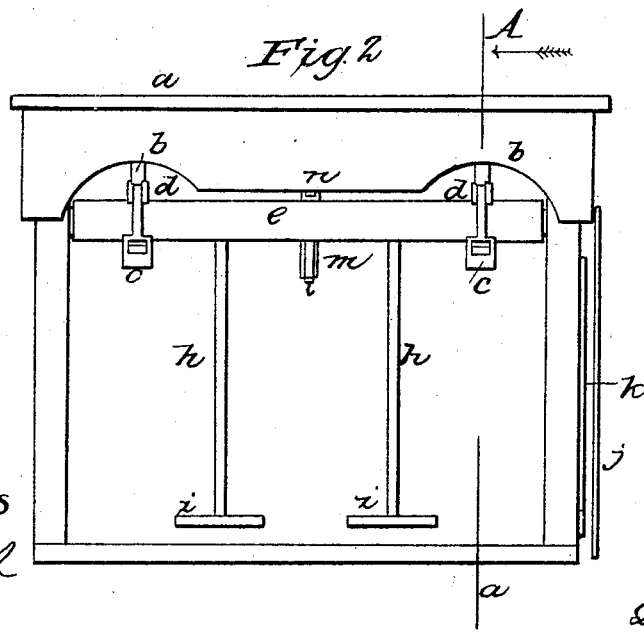
Witnesses
Wm H Bishop
Andrew De Lacy
Inventor
David M. Smyth

UNITED STATES PATENT OFFICE.

DAVID M. SMYTH, OF NEW YORK, N. Y.

PLATFORM-BALANCE.

Specification of Letters Patent No. 12,698, dated April 10, 1855.

*To all whom it may concern:*

Be it known that I, DAVID M. SMYTH, of the city, county, and State of New York, have invented a new and Improved Platform-Balance, of which the following is a full, clear, and exact description, reference being had to the accompanying drawings, making part of this specification, in which—

Figure 1, is a front elevation; Fig. 2, a side elevation; and Fig. 3, is a vertical section taken at the line A, a, of Fig. 2.

The same letters indicate like parts in all the figures.

My invention consists of a platform for weighing provided with hangers, when suspended from and combined with the arms of two parallel rockers by means of four links, the said rockers being linked together and provided with weighted arms, operating, in connection with the arms to which the hangers are suspended, on the principle of the bent lever, indicating the weight by the gradual elevation of the weighted levers, and as the rockers are linked together it will be immaterial on what part of the platform the article to be weighed may be placed.

In the accompanying drawings a, represents a platform on which the articles to be weighed are placed and having two hangers b, b, near each end and attached to the bottom thereof. The outer ends of these hangers are formed, on their under surfaces, to rest on the knife edges of four links—c, c, c, c, which are in turn suspended to four short arms d, d, d, d, two on each of two parallel rockers e, e, the ends of which are formed with knife edges f, f, resting and vibrating on suitable metallic plates g, g, in the ends of the frame, the surface of the said metallic plates being notched or recessed to receive the knife edges and to prevent slip.

From each of the rockers projects a long arm h, forming, with the short arms d, d, any suitable angle to operate on the principle of the bent lever, and to the outer end of the said long arms h, h, are attached weights i, i, which may be increased by slipping on other weights to increase the capacity of the balance.

To one end of one of the rockers is attached a hand or pointer j, and to the front face of the frame a graduated sector k, to indicate the weight of any article placed on the platform.

The two rockers are connected together by a joint link l, one end of which is connected with an arm m, projecting from the under side of one rocker, and the other end with an arm n, projecting from the upper side of the other rocker, so that the article to be weighed may be placed on any part of the platform and receive an equal resistance from the two weights which would not be the case if the two rockers were not linked together.

I am aware that in platform balances the two rockers that sustain the platform have been connected together so that the articles to be weighed may be placed on any part of the platform, and exert an equal force on the balance, but this has heretofore been combined either with the steelyard or common balance, and therefore I do not wish to be understood as claiming to be the first inventor of such an arrangement irrespective of the combination specified. And I am also aware that scales have been made to operate on the principle of the bent lever to weigh articles of varying weight with one weight, the arm carrying the weight gradually increasing in leverage as the arm sustaining the article to be weighed gradually decreases, but this mode of operation has never been combined with a platform balance, and therefore I do not claim it as a separate device.

What as I claim as my invention and desire to secure by Letters Patent is—

The arrangement of the platform above with hangers suspended at four corners to the two rockers which are linked together, substantially as described, when this is combined with the weighted arms on the rockers operating on the principle of the bent lever, substantially as specified.

DAVID M. SMYTH.

Witnesses:
WM. H. BISHOP,
ANDREW DE LACY.